United States Patent
Pedersen et al.

(10) Patent No.: US 11,689,848 B2
(45) Date of Patent: Jun. 27, 2023

(54) CAPACITIVE SENSOR ASSEMBLY AND ELECTRICAL CIRCUIT THEREFOR

(71) Applicant: Knowles Electronics, LLC, Itasca, IL (US)

(72) Inventors: Michael Pedersen, Long Grove, IL (US); Peter V. Loeppert, Durand, IL (US)

(73) Assignee: Knowles Electronics, LLC, Itasca, IL (US)

( * ) Notice: Subject to any disclaimer, the term of this patent is extended or adjusted under 35 U.S.C. 154(b) by 444 days.

(21) Appl. No.: 16/874,503

(22) Filed: May 14, 2020

(65) Prior Publication Data

US 2021/0360345 A1 Nov. 18, 2021

(51) Int. Cl.
| | |
|---|---|
| *H04R 3/00* | (2006.01) |
| *G01D 5/00* | (2006.01) |
| *H04R 19/04* | (2006.01) |
| *G01D 5/24* | (2006.01) |

(52) U.S. Cl.
CPC ............... *H04R 3/00* (2013.01); *G01D 5/00* (2013.01); *G01D 5/24* (2013.01); *H04R 19/04* (2013.01); *H04R 2201/003* (2013.01)

(58) Field of Classification Search
CPC ... G01D 5/00; G01D 5/24; H04R 3/00; H04R 19/04; H04R 19/016
See application file for complete search history.

(56) References Cited

U.S. PATENT DOCUMENTS

| | | | |
|---|---|---|---|
| 9,692,376 B2 | 6/2017 | Schie | |
| 9,791,638 B2 | 10/2017 | Schie | |
| 2014/0374570 A1* | 12/2014 | Huin | H04N 5/378 |
| | | | 250/208.1 |
| 2017/0184645 A1* | 6/2017 | Sawataishi | G06F 3/04166 |
| 2018/0364275 A1* | 12/2018 | Tao | H03G 3/008 |
| 2019/0272395 A1 | 9/2019 | Schie | |
| 2019/0286977 A1 | 9/2019 | Schie | |

(Continued)

OTHER PUBLICATIONS

Crols, Switched-Opamp: An Approach to Realize Full CMOS Switched-Capacitor Circuits at Very Low Power Supply Voltages, IEEE Journal of Solid-State Circuits, vol. 29, No. 8, Aug. 1994.

(Continued)

*Primary Examiner* — Alonzo Chambliss
(74) *Attorney, Agent, or Firm* — Loppnow & Chapa; Matthew C. Loppnow

(57) ABSTRACT

A capacitive sensor assembly includes a capacitive transduction element and an electrical circuit disposed in the housing and electrically coupled to contacts on an external-device interface of the housing. The electrical circuit includes a sampling circuit having an operational sampling phase during which a voltage produced by the capacitive sensor is sampled by a sampling capacitor coupled to a comparator and an operational charging phase during which a second capacitor is charged by a charge and discharge circuit until the output of the comparator changes state, wherein the output of the sampling circuit is a pulse width modulated signal representative of the voltage on the input of the sampling circuit during each sample period. The output of the sampling circuit can be coupled to a delta-sigma analog-to-digital (A/D) converter.

20 Claims, 6 Drawing Sheets

(56) References Cited

U.S. PATENT DOCUMENTS

2019/0332929 A1    10/2019    Schie

OTHER PUBLICATIONS

Fossum, Active Pixel Sensors: Are CCD's Dinosaurs?, Jet Propulsion Laboratory, California Institute of Technology Pasadena, California, SPIE vol. 1900, Jul. 12, 1993.
Peng, A Charge-Based Low-Power High-SNR Capacitive Sensing Interface Circuit, IEEE Trans Circuits Syst I Regul Pap., Sep. 11, 2008.
Fiorenza, Comparator-Based Switched-Capacitor Circuits for Scaled CMOS Technologies, IEEE Journal of Solid-State Circuits, vol. 41, No. 12, Dec. 2006.

* cited by examiner

US 11,689,848 B2

CAPACITIVE SENSOR ASSEMBLY AND ELECTRICAL CIRCUIT THEREFOR

TECHNICAL FIELD

The disclosure relates generally to capacitive sensor assemblies, for example, microelectromechanical systems (MEMS) microphones, and integrated circuits for such sensor assemblies.

BACKGROUND

Miniature microphones have been widely adopted for use in mobile communication devices, hearing aids, and true wireless stereo (TWS) earphones among other battery-powered devices. These and other applications require microphones with low power consumption, low noise and low distortion, among other characteristics. The once predominate use of electret microphones in these and other applications is being supplanted by microelectromechanical systems (MEMS) microphones for their low cost, small size and high sensitivity.

Capacitive microphones generally comprise a capacitive transduction element or sensor, like a MEMS die, coupled to an electrical circuit that conditions a signal from the sensor before the conditioned signal is output to a host device. The circuit in a digital microphone also includes a continuous time buffer-amplifier between the sensor and a delta-sigma analog-to-digital (A/D) converter. The buffer-amplifier however is a predominant source of power consumption and noise. Thermal noise is inversely proportional to the buffer-amplifier transconductance $g_m$, which is a function of drain current. Flicker noise is inversely proportional to the area of the buffer-amplifier. The input capacitance of the buffer-amplifier is usually a fraction of the capacitance of the capacitive sensor to reduce signal attenuation, but reducing the input capacitance of the buffer-amplifier raises the corner frequency of the noise due to 1/gm noise thus increasing in-band noise for some applications, like microphones. Elimination of the buffer-amplifier will eliminate or mitigate these and other issues in capacitive microphone and other sensor assemblies.

The objects, features and advantages of the present disclosure will become more fully apparent to those of ordinary skill in the art upon careful consideration of the following Detailed Description and the appended claims in conjunction with the accompanying drawings described below.

DETAILED DESCRIPTION

The present disclosure pertains generally to electrical circuits for sensor assemblies comprising a capacitive transduction element (also referred to as a "capacitive sensor"). Such assemblies include microphones, vibration sensors and pressure sensors among other sensor assemblies. The capacitive sensor can be a microelectromechanical (MEMS) die, an electret or as some other capacitive transduction element. MEMS capacitive sensors typically have a capacitance between approximately 0.1 pF and 5.0 pF, but this range is only approximate and other capacitance sensors can have more or less capacitance.

Figure 1:
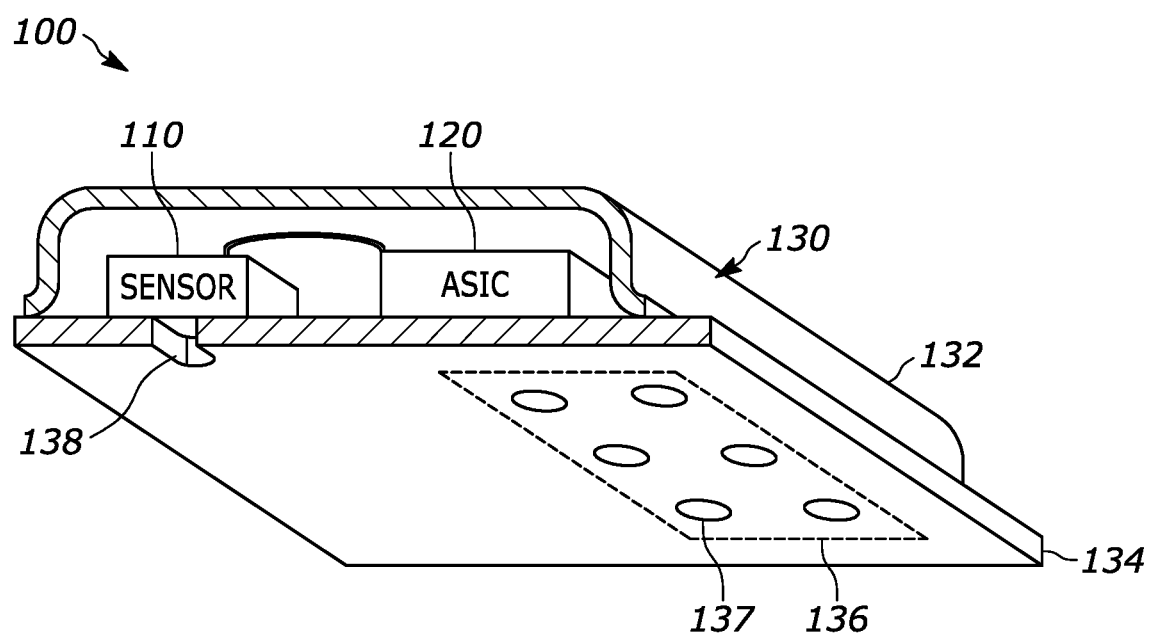
FIG. 1 is a sectional view of a generic sensor assembly.

In FIG. 1, a generic sensor assembly 100 comprises a capacitive sensor 110 electrically coupled to an electrical circuit 120, both of which are disposed in a housing 130 including a lid 132 mounted on a base portion 134 having an external-device interface 136 with contacts 137 electrically coupled to the electrical circuit. The external-device interface can be a surface-mount interface, as shown in FIG. 1, or some other known or future interface technology for integration with a host device. In a typical sensor assembly, the electrical circuit includes power, ground, output and possibly other contacts connectable to corresponding contacts on the external-device interface by wire bonds or other known or future interconnect technology. Microphones and other sensor assemblies include a sound port 138 located on the base or lid and acoustically coupled to the capacitive sensor as is known generally. Vibration sensor assemblies among others however can be devoid of a sound port.

Figure 2:
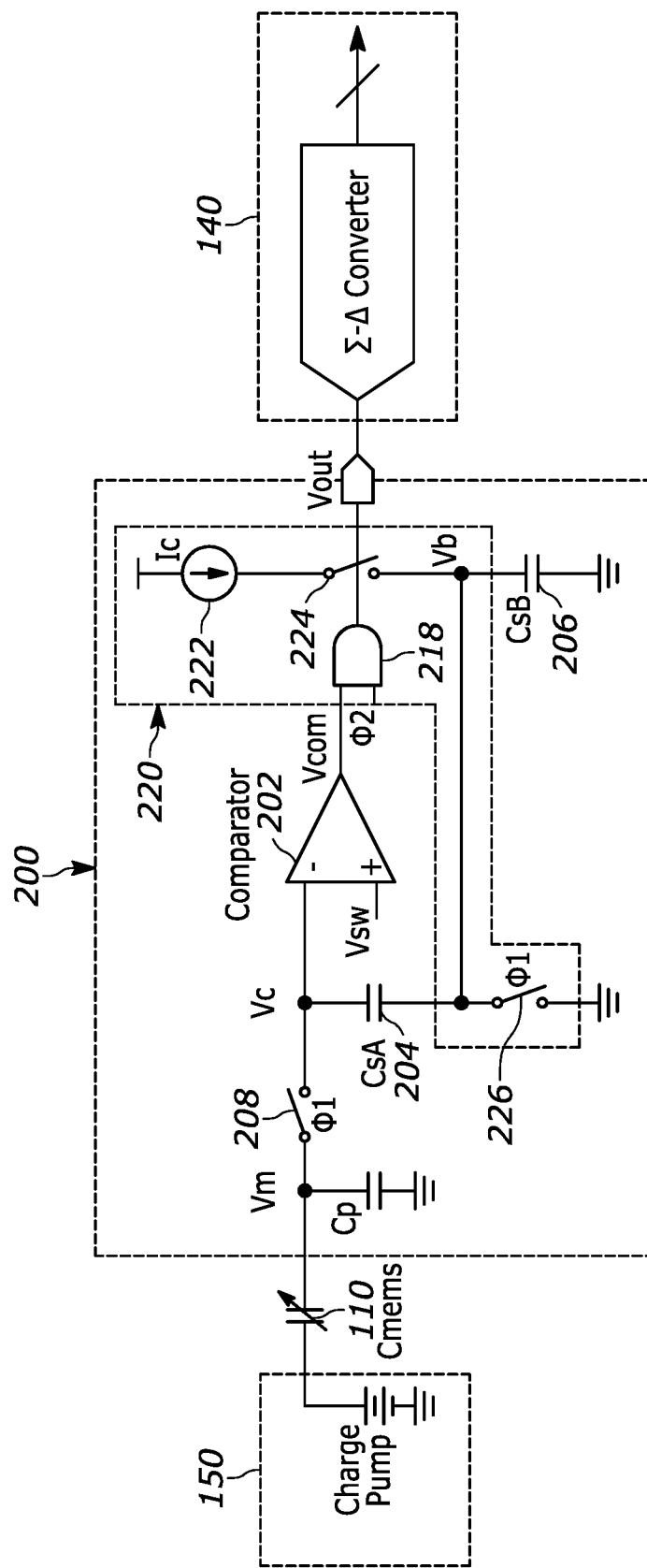
FIG. 2 is an electrical circuit diagram including a sampling circuit in combination with a capacitive sensor.
Figure 3:
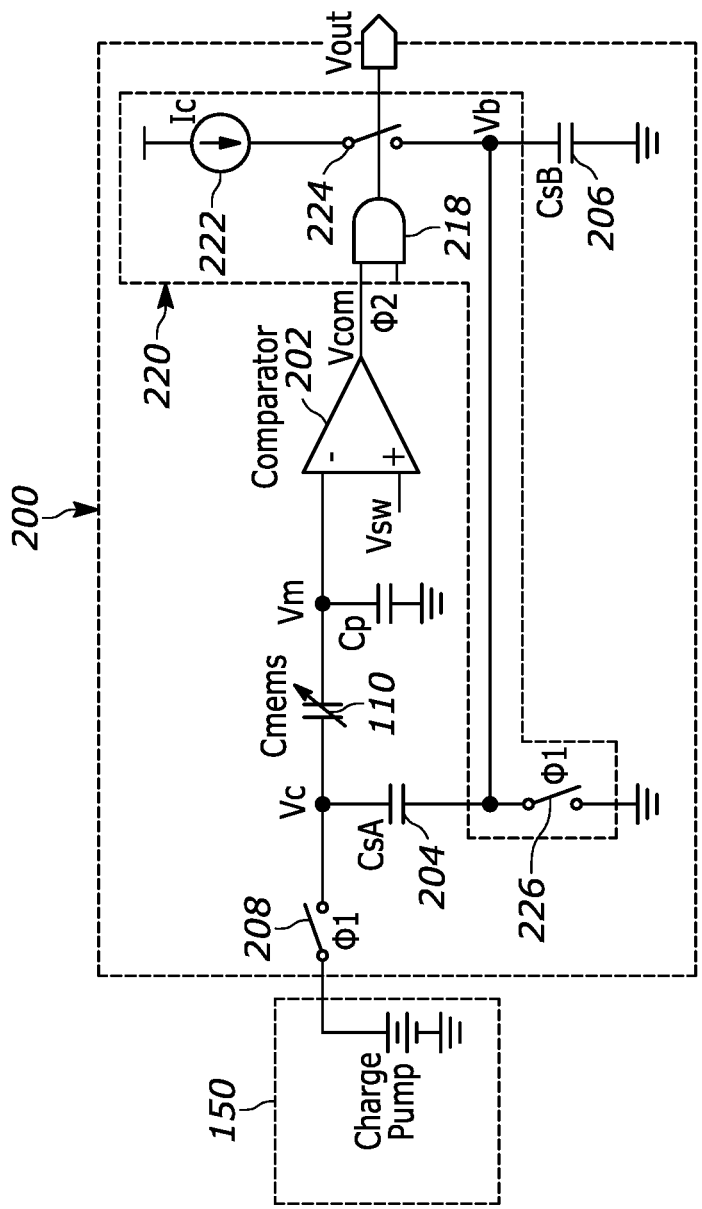
FIG. 3 is another electrical circuit diagram including an alternative sampling circuit in combination with a capacitive sensor.
Figure 5:
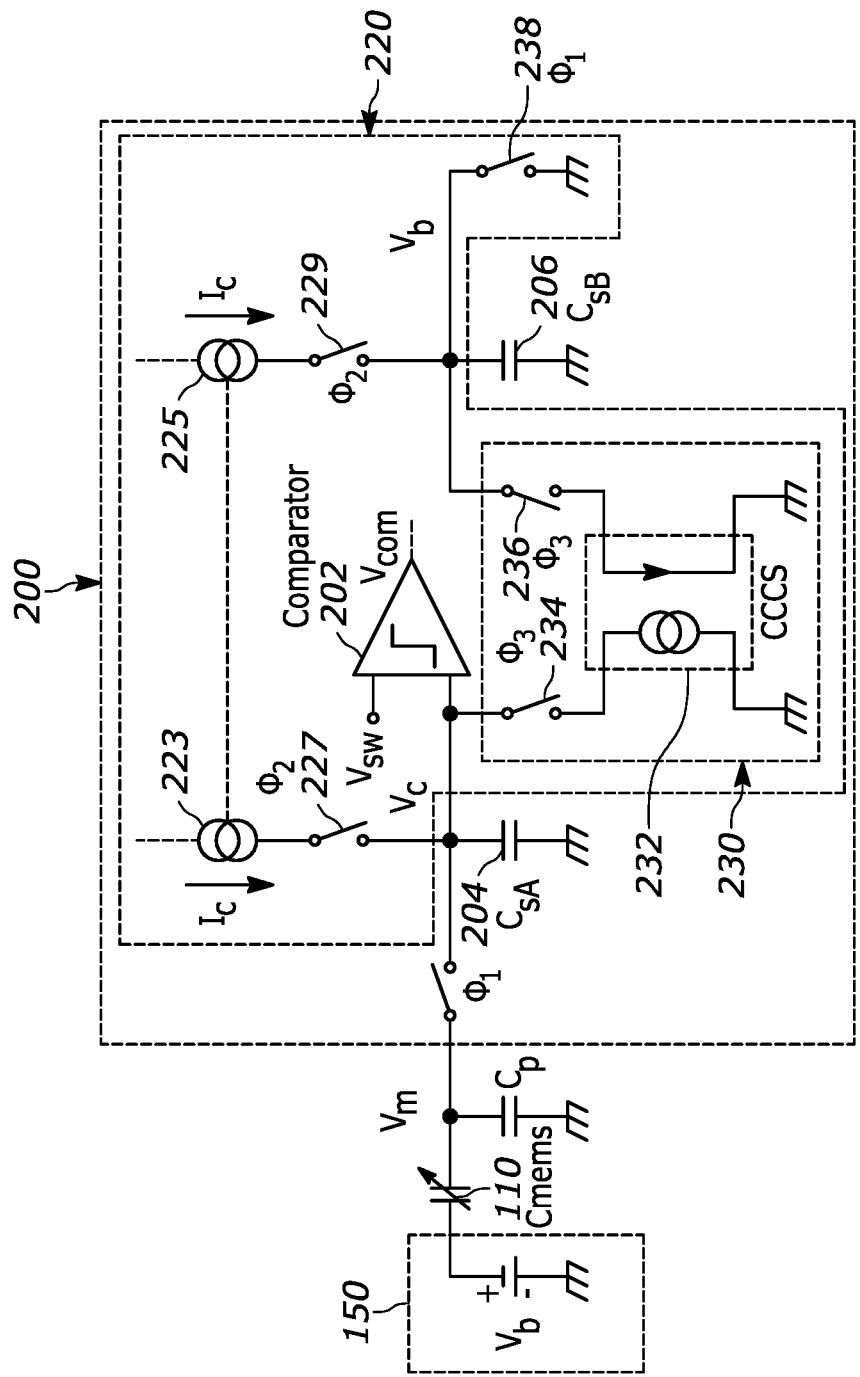
FIG. 5 is yet another electrical circuit diagram including another alternative sampling circuit in combination with a capacitive sensor.

In FIGS. 2, 3 and 5, the electrical circuit comprises a sampling circuit 200 having an input coupled to a capacitive sensor 110 and an output. In FIG. 2, the output of the sampling circuit is coupled to a delta-sigma analog-to-digital (A/D) converter circuit 140 for noise shaping. The circuits of FIGS. 3 and 5 can also include a delta-sigma A/D converter circuit. In FIGS. 2, 3 and 5, a charge pump 150 coupled to the capacitive sensor 110 applies a DC bias thereto. A bias is not required for some capacitive sensors, like electrets and thus some electrical circuits do not include a charge pump. Depending on the intended application, the electrical circuit can also comprise a band-shaping filter, among other circuit elements not shown in the drawings. Microphone assemblies for example may include a protocol interface circuit that formats the output signal for a particular protocol like PCM, PDM, SoundWire, etc. The electrical circuit can be an integrated circuit like an application specific integrated circuit (ASIC).

The sampling circuit generally comprises a comparator having an input coupled to the input of the sampling circuit and an output coupled to the output of the sampling circuit, a sampling capacitor coupled to the input of the comparator, and a charge and discharge circuit coupled to at least a second capacitor. In FIGS. 2, 3 and 5, the sampling circuit includes a comparator 202, a sampling capacitor 204 having a first node coupled to the input to the comparator, and a charge and discharge circuit 220 coupled to at least a first node of a second capacitor 206. The sampling circuit can have a sampling capacitance between approximately 0.01 pF and approximately 0.1 pF, although this range is non-limiting since the capacitance will depend on the capacitance of the sensor. In FIGS. 2, 3 and 5, $C_p$ represents parasitic capacitance.

Generally, the sampling circuit has an operational sampling phase during which a voltage, provided by the capacitive sensor, on the input of the sampling circuit is sampled by the sampling capacitor. The sampling circuit also has an operational charging phase during which the second capacitor is charged by the charge and discharge circuit until the output of the comparator changes state. The output of the sampling circuit is a pulse width modulated signal representative of the voltage on the input of the sampling circuit during each sample period. The sampling frequency is typically at least twice the frequency of the bandwidth of interest and can be higher for implementations including a delta-sigma modulator. These and other aspects of the circuit are described further herein.

According to a first implementation of the sampling circuit, the sampling capacitor samples a voltage produced by the capacitive sensor on the input of the sampling circuit during the sampling phase. The sampling capacitor can sample the voltage on the capacitive sensor by actuation of a sampling switch. In FIG. 2, a first node of the capacitive sensor 110 is coupled to an output of the charge pump 150 and a sampling switch 208 selectably couples a second node of the capacitive sensor to the first node of the sampling capacitor 204, wherein the sampling switch is actuated (i.e., closed) by a sampling signal $\Phi_1$ during the sampling phase. In FIG. 3, alternatively, the sampling switch 208 selectably couples the output of the charge pump 150 to the first node of the capacitive sensor 110 and the second node of the capacitive sensor is coupled to the input of the comparator 202. Other sampling switch configurations are also possible.

In FIGS. 2 and 3, the charge and discharge circuit includes a current source 222 selectably coupled to the first node of the second capacitor 206 by a charge switch 224, wherein the charge switch is actuated by a charge signal $\Phi_2$ during the charging phase. The charge and discharge circuit also includes a discharge switch 226 coupled to the first node of the second capacitor 206, wherein the discharge switch is actuated (i.e., closed) by the sampling signal $\Phi_1$ during the sampling phase. The second capacitor 206 is discharged during the sampling phase. The first node of the second capacitor is also coupled to a second node of the sampling capacitor.

The sampling circuit includes a logic circuit coupled to the output of the comparator, wherein an output of the logic circuit is a function of the output of the comparator and the charge signal $\Phi_2$ applied to the logic circuit. The output of the logic circuit is coupled to the output of the sampling circuit. In FIGS. 2 and 3, the logic circuit is an AND gate 218 coupled to the output of the comparator. The charge signal $\Phi_2$ is applied to an input of the AND gate to control the output of the sampling circuit as described further herein. Equivalent logic circuits can be used alternatively.

Figure 4:
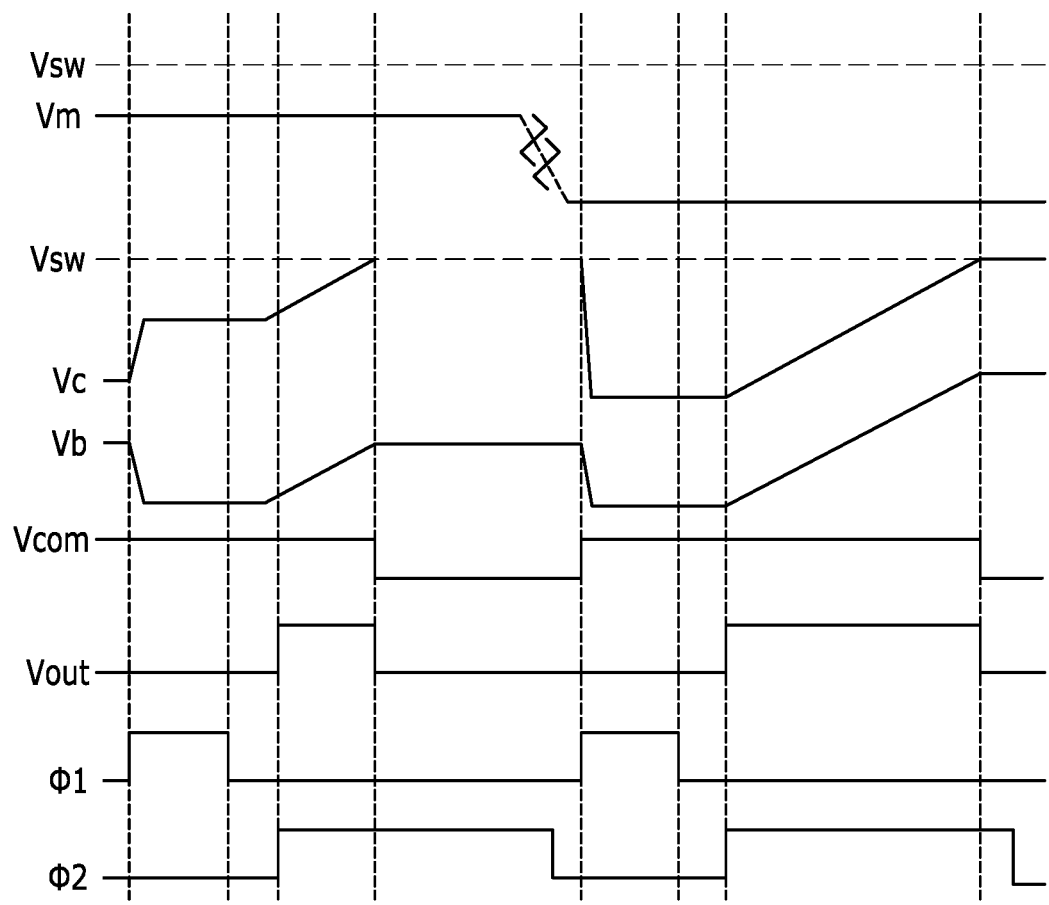
FIG. 4 is a timing diagram for the sampling circuits in FIGS. 2 and 3.

In FIG. 4, enabling the sampling signal $\Phi_1$ actuates (i.e., closes) the sampling switch 208 and the discharge switch 226 of FIGS. 2 and 3. In FIG. 4, during the sampling phase, the sampling capacitor 204 samples the voltage on the capacitive sensor 110 as depicted by plot Vc and the second capacitor 206 is discharged as depicted by plot Vb. During the sampling phase, the charge signal $\Phi_2$ is disabled. After the sampling signal $\Phi_1$ is disabled, the voltage Vc on the sampling capacitor and the voltage Vb on the second capacitor remain unchanged until the charge signal $\Phi_2$ is enabled.

In FIG. 4, enabling the charge signal $\Phi_2$ actuates (i.e., closes) the charge switch 224 so that the current source 222 can charge the second capacitor 206 of FIGS. 2 and 3. During the charging phase, the sampling signal $\Phi_1$ is disabled (i.e., sampling switch 208 and discharge switch 226 in FIGS. 2 and 3 are open) and the voltage at the input of the comparator is the sum of the rising voltage on the series connected sampling capacitor 204 and the charging second capacitor 206. In FIG. 4, plot Vc depicts the rising voltage at the comparator input during the charging phase after the charge signal $\Phi_2$ is enabled. The comparator output voltage Vcom changes state when the voltage Vc at the comparator input reaches the comparator reference Vsw.

In FIG. 4, the comparator output depicted by plot Vcom is high when the voltage Vc at the input of the comparator is less than the reference voltage Vsw. However, the logic circuit drives the sampling circuit output voltage Vout high only when the charge signal $\Phi_2$ is enabled and the comparator output voltage Vcom is high. The logic circuit will drive the sampling circuit output Vout low when either the comparator output Vcom is low or the charge signal $\Phi_2$ is disabled. The sampling circuit produces a high output voltage Vout for a duration corresponding to a time required to change the state of the comparator after the charge signal $\Phi_2$ is enabled, depending on the voltage Vc on the sampling capacitor of FIGS. 2 and 3. Thus configured, the output of the sampling circuit is a pulse width modulated signal representative of a voltage on the input of the sampling circuit during each sample period.

According to a second implementation of the sampling circuit, the sampling capacitor samples a voltage produced by the capacitive sensor on the input of the sampling circuit during the sampling phase, the sampling capacitor and the second capacitor are charged by the charge and discharge circuit during the charging phase, and the sampling capacitor and the second capacitor are at least partially discharged during a reset phase.

The sampling capacitor can sample the voltage on the capacitive sensor by actuation of a sampling switch. In FIG. 5, a first node of the capacitive sensor 110 is coupled to an output of the charge pump 150 and the sampling switch 208 selectably couples the second node of the capacitive sensor to the first node of the sampling capacitor 204, wherein the sampling switch is actuated (i.e., closed) by a sampling signal $\Phi_1$ during the sampling phase. Alternatively, the sampling switch can selectably couple the output of the charge pump to the first node of the capacitive sensor and the second node of the capacitive sensor can be coupled to the input of the comparator as described above in connection with FIG. 3. Other sampling switch configurations are also possible.

In FIG. 5, the charge and discharge circuit 220 includes a first current source 223 selectably coupled to the first node of the sampling capacitor 204 and a second current source 225 selectably coupled to the first node of the second capacitor 206 during the charging phase until the output of the comparator 202 changes state. The comparator 202 is not part of the charge and discharge circuit. The charge and discharge circuit includes a first charge switch 227 between the first current source 223 and the first node of the sampling capacitor 204, and a second charge switch 229 between the second current source 225 and the first node of the second capacitor 206, wherein the first charge and second charge switches are actuated (i.e., closed) by the charge signal $\Phi_2$ during the charging phase. The current sourced by the current sources 223 and 225 can be the same or different, depending on circuit design.

In FIG. 5, the charge and discharge circuit 220 also includes a current mirror circuit 230 having a current controlled current source 232 coupled to the first node of the sampling capacitor 204 by a first discharge switch 234. The current mirror circuit 230 also has an input coupled to the first node of the second capacitor 206 by a second discharge switch 236. A reset signal $\Phi_3$ actuates (i.e., closes) the first discharge switch 234 and the second discharge switch 236 of the current mirror circuit during the reset phase, wherein the current mirror circuit discharges the sampling capacitor 204 by an amount of electrical charge determined by the amount of electrical charge discharged from the second capacitor 206.

Figure 6:
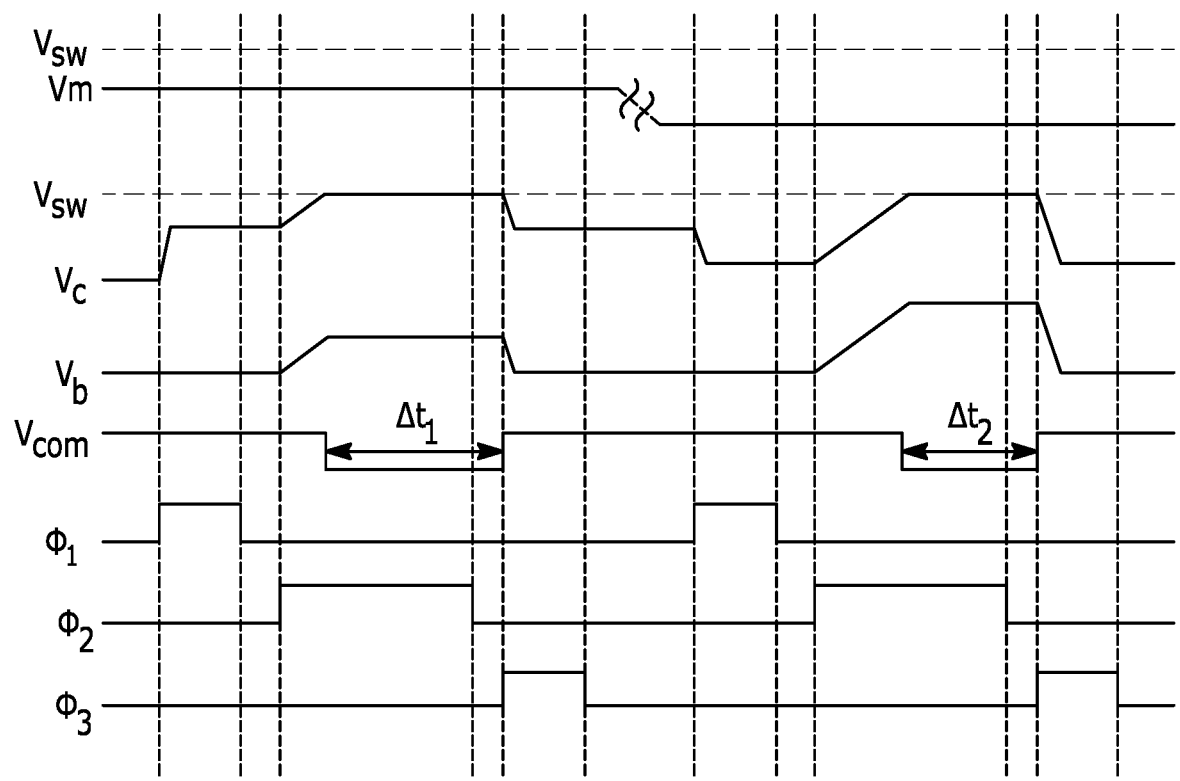
FIG. 6 is a timing diagram for the sampling circuit in FIG. 5.

In FIG. 6, enabling the sampling signal $\Phi_1$ actuates (i.e., closes) the sampling switch 208 in FIG. 5 during the sampling phase. In some embodiments, the second capacitor 206 is optionally discharged upon actuation of a discharge switch 238 by the sampling signal $\Phi_1$ during the sampling phase to ensure that the second capacitor is charged from a specific state during each cycle. Alternatively, the discharge switches 236 and 238 can be implemented as a single discharge switch that is closed by the sampling signal $\Phi_1$ during the sampling phase and by the reset signal $\Phi_3$ during the reset phase. During the sampling phase, the sampling capacitor 204 in FIG. 5 samples the voltage on the capacitive sensor 110 as depicted by plot Vc and the second capacitor 206 is discharged as depicted by plot Vb. The charge signal $\Phi_2$ and the reset signal $\Phi_3$ are disabled during the sampling phase. After the sampling signal $\Phi_1$ is disabled, the voltage Vc on the sampling capacitor and the voltage Vb on the second capacitor remain unchanged until the charge signal $\Phi_2$ is enabled.

In FIG. 6, enabling the charge signal $\Phi_2$ actuates (i.e., closes) the first charge switch 227 and the second charge switch 229 so that the first and second current sources 223 and 225 can charge respectively the sampling capacitor 204 and the second capacitor 206 of FIG. 5. During the charging phase, the sampling signal $\Phi_1$ is disabled (i.e., sampling switch 208 and discharge switch 238 in FIG. 5 are open) and the voltage at the input of the comparator increases with the rising voltage on the sampling capacitor. Plot Vc depicts the rising voltage at the comparator input during the charging phase. The comparator output Vcom is high when the voltage Vc at the input of the comparator is less than the reference voltage Vsw. The comparator output voltage Vcom changes state when the voltage Vc at the comparator input reaches the comparator reference Vsw. As described for other implementations, the sampling circuit may further include a logic circuit, such as an AND gate, in which charging switches 227 and 229 are controlled by the output of the comparator and the state of the charge signal $\Phi_2$. Depending on the implementation, the output of the comparator or the output of the logic circuit can correspond to the output of the sampling circuit.

In FIG. 6, enabling the reset signal $\Phi_3$ actuates (i.e., closes) the first and second discharge switches 234 and 236 of the current mirror circuit to discharge the sampling capacitor 204 and the second capacitor 206 in FIG. 5. During the reset phase, the sample signal $\Phi_1$ and the charge signal $\Phi_2$ are disabled. The current mirror circuit discharges the same charge, or a scaled amount of charge, from the sampling capacitor as discharged from the second capacitor. In FIG. 6, plot Vcom shows that the comparator output changes states (i.e., from high to low) when the comparator input voltage Vc reaches the reference voltage Vsw. In the case where the comparator output corresponds to the output of the sampling circuit, the comparator output remains low for a time interval during which the comparator input is at the reference voltage Vsw. When the voltage Vm on the capacitive sensor is relatively high, the duration $\Delta t_1$ of the sampling circuit output voltage pulse Vcom is relatively long compared to the pulse duration $\Delta t_2$ when the voltage Vm on the capacitive sensor is relatively low. The difference in the pulse durations is attributable the time required for the voltage Vc at the input of the comparator to reach the reference voltage Vsw prior to enabling the reset signal $\Phi_3$. Thus configured the output of the sampling circuit is a pulse width modulated signal representative of a voltage on the input of the sampling circuit during each sample period.

In one implementation, a capacitive sensor assembly comprises generally a housing, a capacitive transduction element or sensor disposed in the housing and acoustically coupled to a sound port of the housing, and an electrical circuit disposed in the housing and electrically coupled to contacts on an external-device interface of the housing. The electrical circuit comprises generally a sampling circuit having an input coupled to a node of the capacitive sensor, the sampling circuit having an operational sampling phase during which a voltage produced by the capacitive sensor is sampled by a sampling capacitor having a first node coupled to an input of a comparator, the sampling circuit having an operational charging phase during which a second capacitor is charged by a charge and discharge circuit until the output of the comparator changes state, wherein the output of the sampling circuit is a pulse width modulated signal representative of the voltage on the input of the sampling circuit during each sample period, and a delta-sigma analog-to-digital (A/D) converter having an input coupled to an output of the sampling circuit, an output of the A/D converter coupled to an output of the electrical circuit.

In one particular embodiment of the sensor assembly, the capacitive sensor is a microelectromechanical systems (MEMS) die having a capacitance between approximately 0.5 pF and approximately 5.0 pF, the electrical circuit further comprises a charge pump having an output coupled to a first node of the capacitive sensor, and the sampling circuit has an input capacitance between approximately 0.01 pF and approximately 0.1 pF. Alternatively, other capacitive transduction elements can be used, some of which do not require a bias.

In a first more particular implementation of the sampling circuit, a first node of the second capacitor is coupled to a second node of the sampling capacitor during the charging phase and the voltage on the input of the sampling circuit is sampled by the sampling capacitor when the second capacitor is discharged.

The first more particular implementation of the sampling circuit can include a logic circuit coupled between an output of the comparator and an output of the sampling circuit, wherein the output of the logic circuit is a function of the output of the comparator and a charge signal applied to the logic circuit.

In the first more particular implementation of the sampling circuit, the charge and discharge circuit can include a current source selectably coupled to the first node of the second capacitor, wherein a charge signal enables the current source to charge the second capacitor during the charging phase.

The first more particular implementation of the sampling circuit can also include a sampling switch coupled to the first node of the sampling capacitor, wherein the sampling switch is actuated by a sampling signal during the sampling phase, and a discharge switch coupled to the first node of the second capacitor, wherein the discharge switch is actuated by the sampling signal during the sampling phase, and a charge switch between the current source and the first node of the second capacitor, wherein the charge switch is actuated by a charge signal during the charging phase.

In a second more particular implementation of the sampling circuit, the charge and discharge circuit includes a first current source selectably coupled to the first node of the sampling capacitor and the charge and discharge circuit includes a second current source selectably coupled to a first node of the second capacitor, wherein the sampling capacitor and the second capacitor are charged by the first current source and the second current source during the charging phase, and the sampling circuit has an operational reset phase during which the sampling capacitor and the second capacitor are at least partially discharged.

The second more particular implementation of the sampling circuit can include a current mirror circuit including a current controlled current source coupled to the first node of the sampling capacitor, and an input of the current mirror coupled to the first node of the second capacitor, wherein the current mirror circuit discharges an amount of electrical charge on the sampling capacitor based on an amount of electrical charge discharged from the second capacitor during the reset phase.

The second more particular implementation of the sampling circuit can also include a sampling switch coupled to the first node of the sampling capacitor, wherein the sampling switch is actuated by a sampling signal during the sampling phase, a first charge switch between the first current source and the first node of the sampling capacitor and a second charge switch between the second current source and the first node of the second capacitor, wherein the first and second charge switches are actuated by a charge signal during the charging phase. The current mirror circuit can includes a first discharge switch between the first node of the second capacitor and the input of the current mirror circuit and a second switch between the current controlled current source and the first node of the sampling capacitor, wherein the first and second switches are actuated by a discharge signal during the reset phase.

While the present disclosure and what is presently considered to be the best mode thereof has been described in a manner establishing possession by the inventors and enabling those of ordinary skill in the art to make and use the same, it will be understood and appreciated that equivalents of the exemplary embodiments disclosed herein exist, and that myriad modifications and variations may be made thereto, within the scope and spirit of the disclosure, which is to be limited not by the exemplary embodiments described but by the appended claims.

What is claimed is:

1. An electrical circuit for a capacitive sensor assembly, the circuit comprising:
    a sampling circuit having an input connectable to a node of a capacitive sensor, the sampling circuit comprising:
        a comparator having an input coupled to the input of the sampling circuit, the comparator having an output coupled to the output of the sampling circuit;
        a sampling capacitor having a first node coupled to the input of the comparator;
        a second capacitor having a first node coupled to a second node of the sampling capacitor;
        a charge and discharge circuit coupled to the first node of the second capacitor;
        the sampling circuit having an operational sampling phase during which a voltage on the input of the sampling circuit is sampled by the sampling capacitor when the second capacitor is discharged, and the sampling circuit having an operational charging phase during which the second capacitor is charged while coupled in series to the sampling capacitor,
    wherein the output of the sampling circuit is a pulse width modulated signal representative of a voltage on the input of the sampling circuit during each sample period.

2. The circuit of claim 1 further comprising a delta-sigma analog-to-digital (A/D) converter coupled to the output of the sampling circuit.

3. The circuit of claim 2, wherein the output of the comparator changes state when a voltage on the input of the comparator exceeds a comparator reference signal during the charging phase.

4. The circuit of claim 3, the charge and discharge circuit includes a current source selectably coupled to the first node of the second capacitor, wherein the current source is enabled to charge the second capacitor during the charging phase until the output of the comparator changes state.

5. The circuit of claim 4 further comprising a logic circuit coupled to an output of the comparator, an output of the logic circuit coupled to the output of the sampling circuit, wherein the output of the logic circuit is a function of the output of the comparator and a charge signal applied to the logic circuit.

6. The circuit of claim 5 further comprising:
    a sampling switch coupled to the first node of the sampling capacitor, wherein the sampling switch is actuated by a sampling signal during the sampling phase, the sampling switch connectable to a second node of the capacitive sensor;
    the charge and discharge circuit including a discharge switch coupled to the first node of the second capacitor, wherein the discharge switch is actuated by the sampling signal during the sampling phase; and
    the charge and discharge circuit including a charge switch between the current source and the first node of the second capacitor, wherein the charge switch is actuated by a charge signal during the charging phase.

7. The circuit of claim 5 further comprising:
    a charge pump having an output;
    a sampling switch coupled to the charge pump output and to the first node of the sampling capacitor, wherein the sampling switch is actuated by a sampling signal during the sampling phase, the sampling switch connectable to the first node of the capacitive sensor and the input of the comparator connectable to the second node of the capacitive sensor;
    the charge and discharge circuit including a discharge switch coupled to the first node of the second capacitor, wherein the second switch is actuated by the sampling signal during the sampling phase; and
    the charge and discharge circuit including a charging switch between the current source and the first node of the second capacitor, wherein the charging switch is actuated by a charge signal during the charging phase.

8. The circuit of claim 5 wherein the sampling circuit has an input capacitance between approximately 0.01 pF and approximately 0.10 pF.

9. The circuit of claim 8 in combination with a capacitive sensor embodied as a microelectromechanical systems (MEMS) die having a first node, a second node, and a capacitance between approximately 0.5 pF and approximately 5.0 pF.

10. The circuit of claim 2 further comprising a charge pump having an output connectable to a first node of a capacitive sensor.

11. An electrical circuit for a capacitive sensor assembly, the circuit comprising:
    a sampling circuit having an input connectable to a node of a capacitive sensor, the sampling circuit comprising:
        a comparator having an input coupled to the input of the sampling circuit, the comparator having an output coupled to the output of the sampling circuit;
        a sampling capacitor having a first node coupled to the input of the comparator;
        a second capacitor;

a charge and discharge circuit coupled to the first node of the sampling capacitor and to a first node of the second capacitor, the sampling circuit having an operational sampling phase during which a voltage on the input of the sampling circuit is sampled by the sampling capacitor, the sampling circuit having an operational charging phase during which the sampling capacitor and the second capacitor are charged by the charge and discharge circuit, and the sampling circuit having an operational reset phase during which the sampling capacitor and the second capacitor are at least partially discharged, wherein the output of the sampling circuit is a pulse width modulated signal representative of a voltage on the input of the sampling circuit during each sample period.

12. The circuit of claim 11 further comprising a sigma-delta analog-to-digital (A/D) converter coupled to the output of the sampling circuit.

13. The circuit of claim 12, wherein the output of the comparator changes state when a voltage on the input of the comparator exceeds a comparator reference signal during the charging phase.

14. The circuit of claim 13, the charge and discharge circuit including a first current source selectably coupled to the first node of the sampling capacitor and a second current source selectably coupled to the first node of the second capacitor, wherein the first current source and the second current source are enabled during the charging phase until the output of the comparator changes state.

15. The circuit of claim 14, the charge and discharge circuit including a current mirror circuit having a current controlled current source coupled to the first node of the sampling capacitor, the current mirror circuit having an input coupled to the first node of the second capacitor, wherein the current mirror circuit discharges an amount of electrical charge on the sampling capacitor based on an amount of electrical charge discharged from the second capacitor during the reset phase.

16. The circuit of claim 15 further comprising:
a sampling switch coupled to the first node of the sampling capacitor, wherein the sampling switch is actuated by a sampling signal during the sampling phase, the sampling switch connectable to a second node of the capacitive sensor,
the charge and discharge circuit including a first charge switch between the first current source and the first node of the sampling capacitor, and the charge and discharge circuit including a second charge switch between the second current source and the first node of the second capacitor, wherein the first charge switch and the second charge switch are actuated by a charge signal during the charging phase,
the current mirror circuit including a first discharge switch between the first node of the second capacitor and the input of the current mirror circuit, the current mirror circuit including a second switch between the current controlled current source and the first node of the sampling capacitor, wherein the first switch and the second switch of the current mirror circuit are actuated by a discharge signal during the reset phase.

17. The circuit of claim 15 further comprising:
a charge pump having an output;
a sampling switch coupled to the charge pump output and connectable to the first node of the capacitive sensor, wherein the sampling switch is actuated by a sampling signal during the sampling phase, and the input of the comparator is connectable to the second node of the capacitive sensor;
the charge and discharge circuit including a first charge switch between the first current source and the first node of the sampling capacitor and the charge and discharge circuit including a second charge switch between the second current source and the first node of the second capacitor, wherein the first charge switch and the second charge switch are actuated by a charge signal during the charging phase,
the current mirror circuit including a first discharge switch between the first node of the second capacitor and the input of the current mirror circuit, the current mirror circuit including a second switch between the current controlled current source and the first node of the sampling capacitor, wherein the first switch and the second switch of the current mirror circuit are actuated by a discharge signal during the reset phase.

18. The circuit of claim 15 wherein the sampling circuit has an input capacitance between approximately 0.01 pF and approximately 0.1 pF.

19. The circuit of claim 18 in combination with a capacitive sensor embodied as a microelectromechanical systems (MEMS) die having a first node, a second node, and a capacitance between approximately 0.5 pF and approximately 5.0 pF.

20. The circuit of claim 12 further comprising a charge pump having an output connectable to a first node of a capacitive sensor.

* * * * *